W. C. RAMSAY.
Cotton Bale Ties.

No. 137,570.

Patented April 8, 1873.

Witnesses
John A. Ellis
Jas. E. Hutchinson

Inventor
Wilson C. Ramsay.
Per
C. H. Watson & Co
Attys

UNITED STATES PATENT OFFICE.

WILSON C. RAMSAY, OF WADESBOROUGH, NORTH CAROLINA.

IMPROVEMENT IN COTTON-BALE TIES.

Specification forming part of Letters Patent No. 137,570, dated April 8, 1873; application filed March 3, 1873.

*To all whom it may concern:*

Be it known that I, WILSON C. RAMSAY, of Wadesborough, in the county of Anson and State of North Carolina, have invented certain new and useful Improvements in Cotton-Bale Ties; and I do hereby declare that the following is a full, clear, and exact description thereof, that will enable others skilled in the art to which it appertains to make and use the same, reference being had to the accompanying drawing and to the letters of reference marked thereon which form a part of this specification.

The nature of my invention consists in the construction and arrangement of a cotton-bale tie, formed of a single strap of hoop-iron or other suitable metal, and provided with a metal loop having points or teeth on its under side, all as more fully hereinafter shown and described.

Figure 1:
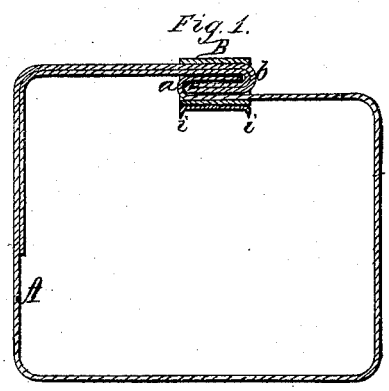
Figure 2:
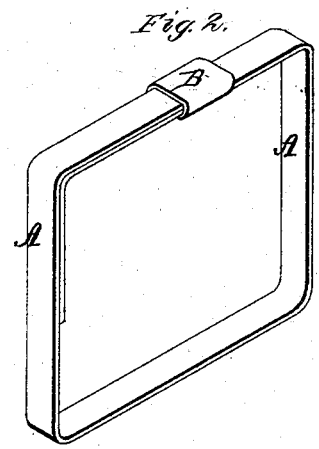

In the accompanying drawing, Figure 1 is a longitudinal section, and Fig. 2 a perspective view, of my invention.

A represents a strap of hoop or band iron or other suitable metal, of any desired length, and of such width and thickness as may be deemed most suitable for the purpose for which it is intended. One end of the strap A is bent over on the upper side to form the hook $a$, as shown in Fig. 1. When the strap is put around the bale and the bale pressed, the other end of the strap is bent under to make it of the necessary length, and the thus double end is again bent under to form the hook $b$, which is placed into and catches on the hook $a$ at the other end of the strap. A metal loop, B, previously placed on either end of the strap is then moved so as to cover the joined hooks $a$ and $b$, preventing the same from separating. This loop is, on its inner or under side, provided with points or teeth $i\ i$, which enter the bale and hold the loop in place so that it cannot slip in either direction and move off from the hooks.

This cotton-bale tie is very cheap, and at the same time perfectly secure, and can very readily be placed on the bales.

Having thus fully described my invention, what I claim as my invention is—

As an improvement in bale-ties, the loop B having pointed projections $i\ i$ arranged to operate with the band A, bent substantially as and for the purpose specified.

In testimony that I claim the foregoing I have hereunto set my hand.

WILSON C. RAMSAY.

Witnesses:
FRANK DARLEY,
JOHN A. ELLIS.